United States Patent
Yamashita et al.

(10) Patent No.: US 11,987,698 B2
(45) Date of Patent: May 21, 2024

(54) RESIN COMPOSITION FOR PLATING

(71) Applicant: Techno-UMG Co., Ltd., Tokyo (JP)

(72) Inventors: Shinji Yamashita, Tokyo (JP); Hiroshi Sakai, Tokyo (JP); Hideichiro Kawaguchi, Tokyo (JP)

(73) Assignee: TECHNO-UMG CO., LTD., Tokyo (JP)

( * ) Notice: Subject to any disclaimer, the term of this patent is extended or adjusted under 35 U.S.C. 154(b) by 0 days.

(21) Appl. No.: 17/762,478

(22) PCT Filed: Oct. 28, 2021

(86) PCT No.: PCT/JP2021/039917
§ 371 (c)(1),
(2) Date: Mar. 22, 2022

(87) PCT Pub. No.: WO2022/137801
PCT Pub. Date: Jun. 30, 2022

(65) Prior Publication Data
US 2022/0348764 A1   Nov. 3, 2022

(30) Foreign Application Priority Data
Dec. 23, 2020   (JP) .................. 2020-214083

(51) Int. Cl.
| | | |
|---|---|---|
| *C08L 69/00* | (2006.01) | |
| *C08F 279/04* | (2006.01) | |
| *C08L 55/02* | (2006.01) | |
| *C23C 18/20* | (2006.01) | |

(52) U.S. Cl.
CPC ............ *C08L 69/00* (2013.01); *C08F 279/04* (2013.01); *C08L 55/02* (2013.01); *C08L 2205/02* (2013.01)

(58) Field of Classification Search
None
See application file for complete search history.

(56) References Cited

U.S. PATENT DOCUMENTS

| | | | | |
|---|---|---|---|---|
| 7,851,529 B2 * | 12/2010 | Mitsuhashi | ............. | C08L 83/10 524/451 |
| 2004/0152808 A1 | 8/2004 | Tezuka et al. | | |
| 2009/0226727 A1 | 9/2009 | Higaki | | |
| 2013/0172469 A1 | 7/2013 | Kim et al. | | |
| 2013/0184409 A1 * | 7/2013 | Fujisawa | .................. | C08L 33/12 525/67 |
| 2013/0267635 A1 * | 10/2013 | Seidel | ..................... | C08L 25/12 524/504 |
| 2017/0107373 A1 * | 4/2017 | Matsuyama | .......... | C08F 265/04 |
| 2017/0194069 A1 | 7/2017 | Kim et al. | | |
| 2019/0322786 A1 | 10/2019 | Fujiwara et al. | | |

FOREIGN PATENT DOCUMENTS

| | | |
|---|---|---|
| JP | 8-193162 | 7/1996 |
| JP | 8-269313 | 10/1996 |
| JP | 10046019 | * 2/1998 |
| JP | 2006-328133 | 12/2006 |
| JP | 2011-236263 | 11/2011 |
| JP | 2018-2989 | 1/2018 |
| JP | 2019-500466 | 1/2019 |
| JP | 6938753 | 9/2021 |
| KR | 10-1859011 | 6/2018 |
| WO | 2007/063732 | 6/2007 |

OTHER PUBLICATIONS

International Search Report issued Jan. 18, 2022 in International (PCT) Application No. PCT/JP2021/039917.
Notice of Reasons for Refusal issued Jun. 15, 2021 in corresponding Japanese Application No. 2020-214083, with English translation.

* cited by examiner

*Primary Examiner* — David J Buttner
(74) *Attorney, Agent, or Firm* — Wenderoth, Lind & Ponack, L.L.P.

(57) ABSTRACT

The resin composition for plating of the present invention includes: a graft copolymer (A) in which a monomer component (a) including specific amounts of an aromatic vinyl compound (a1), a vinyl cyanide compound (a2), and another vinyl compound (a3) is graft-polymerized on a rubbery polymer; and a polycarbonate resin (P), wherein an amount of resin (P) is 40 to 70% by mass, based on a total mass of the resin composition, a rubber content (X) in copolymer (A) is more than 40% by mass, based on a total mass of copolymer (A), a graft ratio (Y) of copolymer (A) satisfies formula (1): $793e^{-0.04LX} \geq Y \geq 515e^{-0.04LX}$ (1), and a rubber content (Z) in the resin composition is 10 to 18% by mass, based on a total mass of the resin composition.

2 Claims, No Drawings

RESIN COMPOSITION FOR PLATING

TECHNICAL FIELD

The present invention relates to a resin composition for plating. Priority is claimed on Japanese Patent Application No. 2020-214083, filed Dec. 23, 2020, the contents of which are incorporated herein by reference.

BACKGROUND ART

Molded products formed of acrylonitrile-butadiene-styrene copolymers (ABS resins) have excellent impact resistance, mechanical strength, and chemical resistance, so that such molded products are used in a wide range of fields such as OA (office automation) equipment, information/communication equipment, electronic/electrical equipment, home electric appliances, automobiles, and construction. Further, plated products obtained by plating the molded products formed of ABS resins show plating performances such as high adhesion strength of a plating film (plating adhesion strength) and excellent hot/cold cycle performance. Therefore, the molded products formed of ABS resins are also used for a wide variety of applications in plastic plating. For example, in the field of automobiles, an attempt is being made to expand the use of such molded products to plating applications such as radiator grill parts and emblem parts.

Further, in recent years, there has been an increasing demand for improvement in impact resistance, heat resistance, and moldability, and polycarbonate resins (PC resins) and PC/ABS resins are also being used.

The plating performance is easily affected by factors such as characteristics of the resin composition forming the molded product, and molding conditions. Therefore, even the use of a resin composition containing an ABS resin cannot eliminate the risk of resulting in poor plating appearance. If the molding conditions are not favorable, appearance defects such as peeling and floating of the plating film occur, and the commercial value of the final product is significantly impaired.

In such a situation, as a thermoplastic resin composition that shows high adhesion strength of the plating film and is free from swelling or cracking of the plating film even when exposed to a hot/cold cycle, a resin composition for plating is proposed, which contains specific types of a copolymer, a graft copolymer, and an organic silicon compound in a specific proportion (Patent Document 1).

PRIOR ART REFERENCES

Patent Document

Patent Document 1: Japanese Unexamined Patent Application, First Publication No. Hei 8-193162

DISCLOSURE OF INVENTION

Problems to be Solved by the Invention

However, in the case of the resin composition for plating of Patent Document 1, the plating adhesion strength of the plated product is not necessarily sufficient, and peeling or floating of the plating film may occur in the hot/cold cycle test.

The object of the present invention is to provide a resin composition for plating, which is capable of producing a plated product having excellent plating performance.

Means to Solve the Problems

The embodiments of the present invention are as follows.

[1] A resin composition for plating, including: a graft copolymer (A) in which a monomer component (a) is graft-polymerized on a rubbery polymer; and a polycarbonate resin (P), wherein an amount of the polycarbonate resin (P) is 40 to 70% by mass, based on a total mass of the resin composition for plating, the monomer component (a) includes 60 to 80% by mass of an aromatic vinyl compound (a1), 20 to 40% by mass of a vinyl cyanide compound (a2), and 0 to 20% by mass of another vinyl compound (a3) copolymerizable with the aromatic vinyl compound (a1) and the vinyl cyanide compound (a2), each based on a total mass of the monomer component (a), a rubber content (X) in the graft copolymer (A) is more than 40% by mass, based on a total mass of the graft copolymer (A), a graft ratio (Y) of the graft copolymer (A) satisfies formula (1) below:

$$793e^{-0.041X} \geq Y \geq 515e^{-0.041X} \quad (1), \text{ and}$$

a rubber content (Z) in the resin composition for plating is 10 to 18% by mass, based on a total mass of the resin composition for plating.

[2] The resin composition for plating according to [1] above, wherein an amount of the graft copolymer (A) is 10 to 50% by mass, more preferably 15 to 50% by mass, even more preferably 17 to 50% by mass, even more preferably 20 to 50% by mass, even more preferably 21 to 50% by mass, even more preferably 21 to 45% by mass, even more preferably 21 to 40% by mass, particularly preferably 21 to 35% by mass, and most preferably 21 to 33% by mass, based on a total mass of the resin composition for plating.

[3] The resin composition for plating according to [1] or [2] above, wherein the rubber content (Z) in the resin composition for plating is 10 to 15% by mass, based on a total mass of the resin composition for plating.

[4] The resin composition for plating according to any one of [1] to [3] above, wherein the rubber content (X) in the graft copolymer (A) is more than 40% by mass and 80% by mass or less, more preferably 45 to 75% by mass, and even more preferably 50 to 70% by mass, based on a total mass of the graft copolymer (A).

[5] The resin composition for plating according to any one of [1] to [4] above, wherein the graft ratio (Y) of the graft copolymer (A) is 20 to 100% by mass, more preferably 25 to 95% by mass, and even more preferably 30 to 90% by mass.

[6] The resin composition for plating according to any one of [1] to [5] above, which further includes a copolymer (B) obtained by copolymerizing an aromatic vinyl compound (b1), a vinyl cyanide compound (b2), and optionally another monovinyl compound (b3).

[7] The resin composition for plating according to [6] above, wherein an amount of the copolymer (B) is 0 to 50% by mass, and more preferably 1 to 45% by mass, based on a total mass of the resin composition for plating.

Effect of the Invention

The present invention can provide a resin composition for plating, which is capable of producing a plated product having excellent plating performance.

DESCRIPTION OF THE EMBODIMENTS

Throughout the present specification and claims, the following terms have respective means as explained below.

The term "molded product" means a product obtained by molding the resin composition for plating of the present invention.

The term "plated product" means a product which is obtained by plating the molded product, and has a plating film on at least a part of the surface of the molded product.

The expression "excellent plating performance" means that the plating adhesion strength is high and the hot/cold cycle performance is good.

The term "(meta)acrylic acid" is a generic term for acrylic acid and methacrylic acid.

The term "(meta)acrylate" is a generic term for acrylate and methacrylate.

Further, "to" indicating a numerical range means that the numerical values described before and after "to" are included as the lower limit and the upper limit of the range.

[Resin Composition for Plating]

The resin composition for plating according to the present invention includes a graft copolymer (A), and a polycarbonate resin (P).

If necessary, the resin composition for plating may further contain a copolymer (B) as long as the effects of the present invention are not impaired.

Further, if necessary, the resin composition for plating may further contain components other than the graft copolymer (A), the polycarbonate resin (P) and the copolymer (B) as long as the effects of the present invention are not impaired.

<Graft Copolymer (A)>

The graft copolymer (A) is a copolymer in which a monomer component (a) is graft-polymerized on a rubbery polymer.

With regard to the graft copolymer (A), it is not easy to identify how the monomer component (a) is graft-polymerized on the rubbery polymer. That is, there exists a situation (impossible/impractical situation) which makes it impossible or almost impractical to directly specify the graft copolymer (A) in terms of its structure or properties. Therefore, it is more adequate to define the graft copolymer (A) with an expression "a monomer component (a) is graft-polymerized on a rubbery polymer".

(Rubbery Polymer)

Examples of the rubbery polymer in the graft copolymer (A) include butadiene rubbers such as polybutadiene, styrene-butadiene copolymers, and acrylic acid ester-butadiene copolymers; conjugated diene rubbers such as styrene-isoprene copolymers; acrylic rubbers such as butyl polyacrylate; olefin rubbers such as ethylene-propylene copolymers; and silicone rubbers such as polyorganosiloxanes. Further, monomers for these rubbery polymers may be used in production of the resin composition. The rubbery polymer may have a composite rubber structure or a core/shell structure.

As the rubbery polymer, butadiene rubbers, acrylic rubbers, or composite rubbery polymers thereof are preferable for achieving a good balance between color tone and impact resistance.

One of these rubbery polymers may be used alone, or two or more types thereof may be used in combination.

The average particle size of the rubbery polymer is preferably 0.20 to 0.50 μm, and more preferably 0.25 to 0.40 μm. When the average particle size of the rubbery polymer is not less than the lower limit value described above, the plating deposition at the time of plating the molded product improves. Further, the hot/cold cycle performance of the plated product improves further. When the average particle size of the rubbery polymer is not more than the upper limit value described above, the plating adhesion strength of the plated product improves further. In addition, the fluidity of the resin composition for plating increases.

The average particle size of the rubbery polymer can be calculated from the mass-based particle size distribution determined by measurement implemented using a particle size distribution measuring device.

The average particle size of the rubbery polymer can be controlled by adjusting the polymerization conditions (temperature, time, etc.) for producing the rubbery polymer, the types of the monomers, and the blending ratio thereof.

The method for producing the rubbery polymer is not particularly limited, but it is preferable to produce the rubbery polymer by emulsion polymerization because the particle size can be easily controlled. The emulsion polymerization can be carried out by a known method, and various catalysts, emulsifiers and the like can be used without particular limitation.

The rubbery polymer may be an enlarged rubber. Further, the average particle size, particle size distribution, etc. can be adjusted by the enlarging operation. Examples of the enlarging method include a mechanical agglomeration method, a chemical agglomeration method, and an agglomeration method using an acid group-containing copolymer.

For example, the chemical agglomeration method may be one in which an acidic substance is added to a rubbery polymer latex to destabilize emulsion to cause agglomeration, and an alkaline substance is added to re-stabilize the rubbery polymer latex when the particle size reaches a desired level as a result of the agglomeration. Examples of the acidic substance include acetic acid, acetic anhydride, sulfuric acid, and phosphoric acid. Examples of the alkaline substance include potassium hydroxide and sodium hydroxide.

Examples of the agglomeration method using an acid group-containing copolymer include a method in which a rubbery polymer latex and an acid group-containing copolymer latex are mixed to obtain a latex of an enlarged rubber. Examples of the acid group-containing copolymer latex include those which can be obtained by polymerizing, in water, monomer components including an acid group-containing monomer (e.g., a carboxy group-containing monomer such as (meth)acrylic acid), an alkyl (meth)acrylate monomer, and if necessary another monomer copolymerizable with these.

(Monomer Component (a))

The monomer component (a) in the graft copolymer (A) includes an aromatic vinyl compound (a1), a vinyl cyanide compound (a2), and if necessary, another vinyl compound (a3).

Examples of the aromatic vinyl compound (a1) include styrene, a-methylstyrene, vinyltoluenes (p-methylstyrene, etc.), halogenated styrenes (p-bromostyrene, p-chlorostyrene, etc.), and p-tert-butyl styrene, dimethyl styrene, and vinyl naphthalene. Of these, styrene and α-methylstyrene are preferable.

One of these aromatic vinyl compounds (a1) may be used alone, or two or more thereof may be used in combination.

Examples of the vinyl cyanide compound (a2) include acrylonitrile and methacrylonitrile. Of these, acrylonitrile is preferable.

One of these vinyl cyanide compounds (a2) may be used alone, or two or more types thereof may be used in combination.

The another vinyl compound (a3) is a vinyl compound copolymerizable with the aromatic vinyl compound (a1) and the vinyl cyanide compound (a2). Examples of such vinyl compounds include alkyl methacrylates such as methyl methacrylate and ethyl methacrylate; alkyl acrylates such as methyl acrylate, ethyl acrylate and butyl acrylate; maleimide compounds such as N-phenylmaleimide and N-cyclohexylmaleimide; unsaturated carboxylic acid compounds such as (meth)acrylic acid, itaconic acid, and fumaric acid.

One of these vinyl compounds (a3) may be used alone, or two or more thereof may be used in combination.

The proportions of the respective vinyl compounds in the monomer component (a) are 60 to 80% by mass for the aromatic vinyl compound (a1), 20 to 40% by mass for the vinyl cyanide compound (a2), and 0 to 20% by mass for the another vinyl compound (a3), each based on the total mass of the monomer component (a). The proportions of the respective compounds within the above ranges improve the balance of performances including the moldability of the resin composition for plating, and the plating adhesion strength and hot/cold cycle performance of the plated product.

(Rubber Content (X))

In the present invention, the proportion of the rubbery polymer, based on the total mass of the graft copolymer (A), is referred to as "rubber content (X) in the graft copolymer (A)".

The proportions of the rubbery polymer and the monomer component (a) are more than 40% by mass for the rubbery polymer and less than 60% by mass for the monomer component (a), each based on the total mass of the graft copolymer (A). The proportions of the rubbery polymer and the monomer component (a) within the above ranges improve the plating adhesion strength and the hot/cold cycle performance of the plated product. Further, the impact resistance of the molded product improves.

The proportion of the rubbery polymer (rubber content (X)) is preferably 45% by mass or more, and more preferably 50% by mass or more, based on the total mass of the graft copolymer (A). The proportion of the rubbery polymer is preferably 80% by mass or less, more preferably 75% by mass or less, and even more preferably 70% by mass or less, based on the total mass of the graft copolymer (A). That is, the proportion of the rubbery polymer is preferably more than 40% by mass and 80% by mass or less, more preferably 45 to 75% by mass, and even more preferably 50 to 70% by mass, based on the total mass of the graft copolymer (A).

The proportion of the monomer component (a) is preferably 20% by mass or more and less than 60% by mass, more preferably 25 to 55% by mass, and even more preferably 30 to 50% by mass, based on the total mass of the graft copolymer (A).

(Graft Ratio (Y))

As described below in detail, before the plating treatment of plating the molded product to obtain a plated product, the molded product is usually etched for the purpose of improving the adhesiveness of the plating film, and the like. When the molded product is etched, the rubbery polymer is eluted into the etching solution, and fine pores are formed on the surface of the molded product. The plating adhesion strength is enhanced presumably because of the metal entering the fine pores. In general, there is a tendency that the closer the shape of the fine pores is to a circle, and the more uniform the distribution of fine pores, the higher the plating adhesion strength and the hot/cold cycle performance.

The rubbery polymer may be deformed or agglomerated by the shearing force applied during the molding of the resin composition for plating. When the rubbery polymer is deformed, the fine pores formed by the etching process are also deformed. Further, the agglomeration of the rubbery polymer deteriorates the uniformity of distribution of fine pores.

As the graft ratio (Y) of the graft copolymer (A) increases, the rubbery polymer becomes less likely to be deformed or agglomerated during the molding, and the plating adhesion strength and hot/cold cycle performance of the plated product tend to increase.

In order to increase the graft ratio (Y), the rubber content (X) in the graft copolymer (A) may be reduced during the polymerization of the graft copolymer.

However, as the rubber content (X) decreases, the impact resistance of the molded product tends to decrease, and the plating adhesion strength of the plated product tends to decrease.

As a result of intensive studies, the present inventors have found that when the graft copolymer (A) having a rubber content (X) of more than 40% by mass has a graft ratio (Y) satisfying the following formula (1), both the rubber content (X) and the graft ratio (Y) are increased in a well-balanced manner, and highly excellent plating performance can be achieved.

For further improving the adhesion strength and the hot/cold cycle performance of the plated product, the graft ratio (Y) more preferably satisfies the following formula (2).

$$793e^{-0.041X} \geq Y \geq 515e^{-0.041X} \tag{1}$$

$$793e^{-0.041X} \geq Y \geq 594e^{-0.041X} \tag{2}$$

The graft ratio (Y) of the graft copolymer (A) is not particularly limited as long as it satisfies the above formula (1), but is preferably 20 to 100% by mass, more preferably 25 to 95% by mass, and even more preferably 30 to 90% by mass.

The graft ratio (Y) is a percentage of the mass (Wa) of the monomer component (a) graft-polymerized on the rubbery polymer, based on the mass (Wd) of the rubbery polymer (i.e., (Wa/Wd)×100). Generally, the graft ratio (Y) can be calculated as follows from the acetone-insoluble fraction of the graft copolymer (A) obtained after the graft polymerization.

Acetone is added to the graft copolymer (A) and heated at 55° C. for 3 hours to extract the acetone-dissolved component. Then, the acetone-insoluble fraction is filtered and dried to measure the mass, and the graft ratio is calculated by the following formula (3). In the following formula (3), "m" is the mass (g) of the graft copolymer (A) before the extraction, "n" is the mass (g) of the acetone-insoluble fraction, and "L" is the rubber content (% by mass) of the graft copolymer (A).

$$\text{Graft ratio (\%)} = \{(n - m \times L)/(m \times L)\} \times 100 \tag{3}$$

Alternatively, the graft ratio may be determined with respect to the filtered and dried acetone-insoluble fraction by measuring the amount of the monomer component (a) graft-polymerized with the rubbery polymer using an infrared spectrophotometer.

As a method for obtaining the acetone-insoluble fraction, other than dissolving the graft polymer (A) in acetone as described above, the acetone-insoluble fraction may be obtained by dissolving the resin composition for plating in acetone. When a polycarbonate resin is blended, the polycarbonate resin is removed by a method such as dissolving it away with chloroform or the like. Thereafter, the monomer component (a) graft-polymerized on the rubbery polymer can be measured using an infrared spectrophotometer to determine the graft ratio.

(Production Method)

The graft copolymer (A) is obtained by polymerizing the monomer component (a) in the presence of a rubbery polymer (graft polymerization). The graft copolymer (A) thus obtained has a configuration in which the vinyl copolymer obtained by polymerizing the monomer component (a) is grafted onto the rubbery polymer.

The method for performing the graft polymerization is not particularly limited, but an emulsion polymerization is preferable because the reaction can be controlled so as to proceed stably. Specific examples of such a method include a method in which the entire amount of the monomer component (a) is added at once to a latex of the rubbery polymer, and then the polymerization is implemented; a method in which a part of the monomer component (a) is added in advance to the latex of the rubbery polymer, and the rest of the monomer component (a) is dropped into the polymerization system while allowing the polymerization to proceed; and a method in which the polymerization is implemented while dropping the entire amount of the monomer component (a) into the latex of the rubbery polymer. The polymerization of the monomer component (a) may be carried out in a single stage or may be divided into two or more stages. When the polymerization is divided into two or more stages, it is also possible to change the type and composition ratio of the monomer component (a) in respective stages.

The graft copolymer (A) obtained by the emulsification polymerization is usually in the form of a latex.

The polymerization conditions may be, for example, at 30 to 95° C. for 1 to 10 hours.

A polymerization initiator, a chain transfer agent (molecular weight modifier), and an emulsifier are usually used for emulsion polymerization.

The rubber content (X) in the graft copolymer (A) can be adjusted by the charged amount (blending amount) of the rubbery polymer.

The graft ratio (Y) can be adjusted by the charged amounts of the rubbery polymer and the monomer component (a), and the amounts of the polymerization initiator and the emulsifier used. Specifically, there is a tendency that when the amounts of the polymerization initiator and the emulsifier are reduced, the graft copolymer (A) having a graft ratio (Y) satisfying the above formula (1) can be easily obtained.

Examples of the polymerization initiator include redox initiators formed by combinations of organic peroxides such as cumene hydroperoxide, diisopropylbenzene hydroperoxide, and paramenthane hydroperoxide with reducing agents such as saccharated pyrophosphate and sulfoxylate; persulfates such as potassium persulfate; peroxides such as benzoyl peroxide (BPO), azobisisobutyronitrile, lauroyl peroxide, tert-butylperoxylaurate, and tert-butylperoxymonocarbonate. The polymerization initiator may be oil-soluble or water-soluble, and may be a combination of oil-soluble and water-soluble ones.

One of these polymerization initiators may be used alone, or two or more of these may be used in combination.

The polymerization initiator can be added all at once or continuously to the latex of the rubbery polymer.

The amount of the polymerization initiator used is preferably 0.05 to 0.25 parts by mass, and more preferably 0.08 to 0.2 parts by mass, relative to 100 parts by mass of a combination of the rubbery polymer and the monomer component (a).

Examples of the chain transfer agent include mercaptans such as octyl mercaptan, n-dodecyl mercaptan, tert-dodecyl mercaptan, n-hexamethyl mercaptan, n-tetradecyl mercaptan, and tert-tetradecyl mercaptan; and an α-methylstyrene dimer.

One of these chain transfer agents may be used alone, or two or more of these may be used in combination.

The chain transfer agent can be added all at once or continuously to the latex of the rubbery polymer.

The amount of the chain transfer agent used is preferably 0.1 to 0.3 parts by mass, and more preferably 0.1 to 0.2 parts by mass, relative to 100 parts by mass of a combination of the rubber polymer and the monomer component (a).

Examples of the emulsifier include carboxylic acid salts such as sodium sarcosinate, potassium salts of fatty acids, sodium salts of fatty acids, dipotassium alkenyl succinate, calcium rosinate, and disproportionated calcium rosinate; and alkylbenzene sulfonates.

One of these emulsifiers may be used alone, or two or more of these may be used in combination.

The amount of the emulsifier used is preferably 0.1 to 0.4 parts by mass, and more preferably 0.1 to 0.3 parts by mass, relative to 100 parts by mass of a combination of the rubber polymer and the monomer component (a).

The graft copolymer (A) is usually obtained in the formed of a latex. Examples of the method for recovering the graft copolymer (A) from the latex of the graft copolymer (A) include a wet method in which the latex of the graft copolymer (A) is put into hot water having a coagulant dissolved therein, thereby coagulating the latex into a slurry; and a spray-drying method in which the latex of the graft copolymer (A) is sprayed to a heated atmosphere, thereby semi-directly recovering the graft copolymer (A).

Examples of the coagulant used in the wet method include inorganic acids such as sulfuric acid, hydrochloric acid, phosphoric acid and nitric acid; and metal salts such as calcium chloride, calcium acetate and aluminum sulfate. The coagulant is selected taking the emulsifier used in the polymerization into consideration. For example, when only a carboxylic acid salt is used as the emulsifier, one or more of the coagulants described above can be used. When an emulsifier showing stable emulsifying effect even at a pH in the acidic range, such as sodium alkylbenzene sulfonate, is used as the emulsifier, a metal salt is suitable as the coagulant.

When the wet method is employed, a graft copolymer (A) in the form of a slurry is obtained. Examples of the method for obtaining a dried graft copolymer (A) from a slurry of the graft copolymer (A) include a method in which, first, the residual emulsifier in the slurry is eluted into water and washed away, and then the slurry is dehydrated by centrifugation or dehydration with a dehydrator or the like, followed by drying with an air flow dryer or the like; and a method in which dehydration and drying are simultaneously implemented with a squeezing dehydrator or an extruder. By such methods, the dried graft copolymer (A) in the form of a powder or particles is obtained.

The washing conditions are not particularly limited, but the washing is preferably implemented under the conditions that reduce the residual emulsifier content to 2% by mass or less relative to 100% by mass of the dried graft copolymer (A).

It is also possible to send the graft copolymer (A) discharged from the squeezing dehydrator or the extruder directly, without recovering the graft copolymer (A), to an extruder or a molding machine for producing the resin composition to thereby obtain a molded product.

<Polycarbonate Resin (P)>

The polycarbonate resin (P) is a resin having carbonate bonds in its main chain.

The polycarbonate resin (P) is not particularly limited, and examples thereof include aromatic polycarbonate resins, aliphatic polycarbonate resins, aliphatic-aromatic polycarbonate resins, and aromatic polyester carbonate resins. These polycarbonate resins (P) may have ends thereof modified to an R—CO— group or an R'—O—CO— group, wherein each of R— and R'— represents a monovalent organic group).

The polycarbonate resin (P) is preferably at least one selected from the group consisting of an aromatic polycarbonate resin and an aromatic polyester carbonate resin from the viewpoint of improving the impact resistance and heat resistance of the molded product, and is more preferably an aromatic polycarbonate resin from the viewpoint of further improving the impact resistance.

The aromatic polycarbonate resin is a polymer having a structural unit represented by the formula —(—O—$X^1$—O—C(=O)—)—. $X^1$ in the formula is a hydrocarbon group having one or more aromatic rings, or a group formed by introducing a hetero atom or a hetero bond into the hydrocarbon group. In $X^1$, the atom directly bonded to the oxygen atom adjacent to $X^1$ is a carbon atom in an aromatic ring.

The aromatic polycarbonate resin is, for example, a reaction product of an ester exchange reaction between an aromatic dihydroxy compound and a carbonate diester, a polycondensate of an aromatic dihydroxy compound and phosgene, produced by an interfacial polycondensation method, or a polycondensate of an aromatic dihydroxy compound and phosgene, produced by a pyridine method.

With regard to the aromatic dihydroxy compound, there is no particular limitation as long as it is a compound having two hydroxy groups bonded to an aromatic ring in the molecule, and examples thereof include dihydroxybenzenes such as hydroquinone and resorcinol, 4,4'-biphenyl, 2,2-bis(4-hydroxyphenyl)propane (hereinafter referred to as "bisphenol A"), 2,2-bis(3,5-dibromo-4-hydroxyphenyl)propane, 2,2-bis(4-hydroxyphenyl-3-methylphenyl)propane, 2,2-bis(3-tert-butyl-4-hydroxyphenyl)propane, 2,2-bis(3,5-dimethyl-4-hydroxyphenyl)propane, bis(4-hydroxyphenyl)methane, 1,1-bis(p-hydroxyphenyl)ethane, 2,2-bis(p-hydroxyphenyl)butane, 2,2-bis(p-hydroxyphenyl)pentane, 1,1-bis(p-hydroxyphenyl)cyclohexane, 1,1-bis(p-hydroxyphenyl)-4-isopropylcyclohexane, 1,1-bis(p-hydroxyphenyl)-3,3,5-trimethylcyclohexane, 1,1-bis(p-hydroxyphenyl)-1-phenylethane, 9,9-bis(p-hydroxyphenyl)fluorene, 9,9-bis(p-hydroxy-3-methylphenyl)fluorene, 4,4'-(p-phenylenediisopropylidene)bisphenol, 4,4'-(m-phenylenediisopropyridene)bisphenol, bis(p-hydroxyphenyl) oxide, bis(p-hydroxyphenyl) ketone, bis(p-hydroxyphenyl) ether, bis(p-hydroxyphenyl) ester, bis(p-hydroxyphenyl) sulfide, bis(p-hydroxy-3-methylphenyl) sulfide, bis(p-hydroxyphenyl) sulfone, bis(3,5-dibromo-4-hydroxyphenyl) sulfone, bis(p-hydroxyphenyl) sulfoxide and the like.

One of these aromatic dihydroxy compounds may be used alone, or two or more thereof may be used in combination.

As the aromatic dihydroxy compound, a compound having a hydrocarbon group between two benzene rings is preferable. Examples of the hydrocarbon group in such a compound include an alkylene group. The hydrocarbon group may be a halogen-substituted hydrocarbon group. Each of the benzene rings may be one in which a hydrogen atom included in the benzene ring is substituted by a halogen atom.

Examples of the compound having a hydrocarbon group between two benzene rings include bisphenol A, 2,2-bis(3,5-dibromo-4-hydroxyphenyl)propane, 2,2-bis(4-hydroxyphenyl-3-methylphenyl)propane, 2,2-bis(3-tert-butyl-4-hydroxyphenyl)propane, 2,2-bis(3,5-dimethyl-4-hydroxyphenyl)propane, bis(4-hydroxyphenyl)methane, 1,1-bis (p-hydroxyphenyl)ethane, 2,2-bis(p-hydroxyphenyl)butane and the like.

Among these, bisphenol A is preferable.

One of these compounds having a hydrocarbon group between two benzene rings may be used alone, or two or more thereof may be used in combination.

Examples of the carbonic diester used for obtaining the aromatic polycarbonate by the transesterification reaction include dimethyl carbonate, diethyl carbonate, di-tert-butyl carbonate, diphenyl carbonate, ditolyl carbonate and the like.

One of these carbonic diesters may be used alone, or two or more of these may be used in combination.

As the polycarbonate resin (P), one type of the resin may be used alone, or two or more types of the resin may be used in combination. For example, two or more types of polycarbonate resins having different viscosity average molecular weights may be used in combination.

The molecular weight of the polycarbonate resin (P) is not particularly limited; however, in general, the viscosity average molecular weight (Mv) converted from the solution viscosity is preferably 15,000 to 40,000, more preferably 17,000 to 30,000, and particularly preferably 18,000 to 28,000. When the viscosity average molecular weight is not less than the lower limit value described above, the impact resistance of the molded product improves. When the viscosity average molecular weight is not more than the upper limit value described above, the fluidity of the resin composition for plating improves.

The viscosity average molecular weight of the polycarbonate resin (P) is a value determined by the solution viscosity method. Specifically, the intrinsic viscosity [η] (unit: dl/g) at a temperature of 25° C. is determined using a solution (sample) prepared by dissolving 0.7 g of the polycarbonate resin (P) in 100 mL of methylene chloride and an Ubbelohde viscometer, and the viscosity average molecular weight (Mv) is obtained by the following formula (4).

$$[\eta]=1.23\times10^{-4}\times Mv^{0.83} \quad (4)$$

<Copolymer (B)>

The copolymer (B) is a product obtained by copolymerizing an aromatic vinyl compound (b1), a vinyl cyanide compound (b2) and, if necessary, another vinyl compound (b3). That is, the copolymer (B) is a copolymer including a monomer unit derived from the aromatic vinyl compound (b1), a monomer unit derived from the vinyl cyanide compound (b2) and, if necessary, a monomer unit derived from the another monovinyl compound (b3).

Examples of the aromatic vinyl compound (b1), the vinyl cyanide compound (b2), and the optional another vinyl compound (b3) used in the copolymer (B) include the same compounds listed above for the aromatic vinyl compound (a1), the vinyl cyanide compound (a2), and the another vinyl compound (a3) used in the graft copolymer (A), and the preferred embodiments are also the same.

The amount of the monomer unit derived from the aromatic vinyl compound (b1) in the copolymer (B) is not particularly limited, but is, for example, preferably 50 to 80% by mass, based on the total mass of the copolymer (B).

The amount of the monomer unit derived from the vinyl cyanide compound (b2) in the copolymer (B) is not particularly limited, but is, for example, preferably 20 to 50% by mass, based on the total mass of the copolymer (B).

The amount of the monomer unit derived from the another vinyl compound (b3) in the copolymer (B) is not particularly limited, but is, for example, preferably 0 to 20% by mass, based on the total mass of the copolymer (B).

The mass average molecular weight of the copolymer (B) is preferably 50,000 to 150,000.

The mass average molecular weight of the copolymer (B) is a standard polystyrene-equivalent value measured by gel permeation chromatography (GPC).

The copolymer (B) can be produced by copolymerizing the aromatic vinyl compound (b1), the vinyl cyanide compound (b2) and, if necessary, the another vinyl compound (b3).

As the polymerization method for producing the copolymer (B), any known polymerization method such as emulsion polymerization, suspension polymerization, bulk polymerization or a combination thereof can be employed.

<Other Components>

Examples of other components include various additives, other resins and the like.

Examples of the additive include known antioxidants, light stabilizers, ultraviolet absorbers, lubricants, plasticizers, stabilizers, ester exchange reaction inhibitors, hydrolysis inhibitors, mold release agents, antistatic agents, colorants (pigments, dyes, etc.), fillers (carbon fiber, glass fiber, wollastonite, calcium carbonate, silica, talc, etc.), flame retardants (bromine-containing flame retardants, phosphorus-containing flame retardants, etc.), flame retardant auxiliary agents (antimonite trioxide, etc.), drip inhibitors (fluororesin, etc.), antibacterial agents, antifungal agents, silicone oil, coupling agents, and the like.

One of these additives may be used alone, or two or more of these may be used in combination.

Examples of other resins include rubber-reinforced styrene resins such as HIPS resins, ABS resins (excluding the graft copolymer (A)), ASA resins, AES resins, and SAS resins, polystyrene resins, nylon resins, methacrylic resins, polyvinyl chloride resins, polybutylene terephthalate resins, polyethylene terephthalate resins, polyphenylene ether resins, and those obtained by modifying these resins with a compatibilizer or a functional group.

One of these other resins may be used alone, or two or more of these may be used in combination.

The essential components and optional components used in the present invention may be products recovered from processes such as a polymerization process, a processing process, and a molding process, or recycled products recovered from the market as long as such products do not have any problem in quality.

<Amount of Each Component>

The amount of the graft copolymer (A) is preferably 10% by mass or more, more preferably 15% by mass or more, even more preferably 17% by mass or more, particularly preferably 20% by mass or more, and most preferably 21% by mass or more, based on the total mass of the resin composition for plating. The amount of the graft copolymer (A) is preferably 50% by mass or less, more preferably 45% by mass or less, even more preferably 40% by mass or less, particularly preferably 35% by mass or less, and most preferably 33% by mass or less, based on the total mass of the resin composition for plating. The upper limit values and lower limit values of the amount of the graft copolymer (A) can be combined in any manner. For example, the amount of the graft copolymer (A) is preferably 10 to 50% by mass, more preferably 15 to 50% by mass, even more preferably 17 to 50% by mass, even more preferably 20 to 50% by mass, even more preferably 21 to 50% by mass, even more preferably 21 to 45% by mass, even more preferably 21 to 40% by mass, particularly preferably 21 to 35% by mass, and most preferably 21 to 33% by mass, based on the total mass of the resin composition for plating.

When the amount of the graft copolymer (A) is not less than the lower limit value described above, the fluidity of the resin composition for plating improves. Further, the impact resistance of the molded product improves. When the amount of the graft copolymer (A) is not more than the upper limit value described above, the plating deposition at the time of plating the molded product improves.

The amount of the polycarbonate resin (P) is 40 to 70% by mass, based on the total mass of the resin composition for plating. When the amount of the polycarbonate resin (P) is not less than the lower limit value described above, the impact resistance of the molded product improves. Further, the hot/cold cycle performance of the plated product improves. When the amount of the polycarbonate resin (P) is not more than the upper limit value described above, the fluidity of the resin composition for plating improves. Further, the plating adhesion strength and the hot/cold cycle performance of the plated product improve.

The amount of the copolymer (B) is preferably 0 to 50% by mass, and more preferably 1 to 45% by mass, based on the total mass of the resin composition for plating. When the amount of the copolymer (B) is not less than the lower limit value described above, the fluidity of the resin composition for plating improves. When the amount of the copolymer (B) is not more than the upper limit value described above, the impact resistance of the molded product improves.

The amount of the other components is preferably 0 to 60 parts by mass with respect to 100 parts by mass of a combination of the graft copolymer (A), the polycarbonate resin (P), and the copolymer (B).

<Rubber Content (Z)>

The rubber content (Z) in the resin composition for plating is 10 to 18% by mass, and preferably 10 to 15% by mass, based on the total mass of the resin composition for plating. When the rubber content (Z) is not less than the lower limit value described above, the impact resistance of the molded product improves. Further, the plating adhesion strength of the plated product improves. When the rubber content (Z) is not more than the upper limit value described above, the hot/cold cycle performance of the plated product improves.

The rubber content (Z) in the resin composition for plating can be determined by the measurement using an infrared spectrophotometer, or can be determined from the charged amount of the rubbery polymer used and the blending amount of the graft copolymer (A).

<Method for Producing Resin Composition for Plating>

The thermoplastic resin composition for plating can be produced by kneading a mixture of the graft copolymer (A), the polycarbonate resin (P), and if necessary, at least one of the copolymer (B) and another component. The method for mixing and kneading the components is not particularly limited, and any general mixing and kneading methods can be employed. For example, the method may be one in which the components are kneaded with an extruder, a Banbury mixer, a kneading roll or the like, and the resulting is cut into pellets with a pelletizer or the like.

The thermoplastic resin composition for plating of the present invention is molded into a molded product.

<Technical Effects>

The resin composition for plating of the present invention described above includes: the graft copolymer (A) having a rubber content (X) of more than 40% by mass and a graft ratio (Y) satisfying the above formula (1); and 40 to 70% by mass of the polycarbonate resin (P), wherein a rubber content (Z) in the resin composition for plating is 10 to 18% by mass. Due to such features, the resin composition can produce a plated product having excellent plating performance. Further, the resin composition for plating of the present invention can produce a molded product having excellent impact resistance and is also excellent in fluidity.

[Molded Product]

The molded product is formed from the resin composition for plating of the present invention described above.

The molded product can be obtained by molding the resin composition for plating of the present invention. Examples of the molding method include an injection molding method, an extrusion molding method, a compression molding method, an insert molding method, a vacuum molding method, a blow molding method and the like.

Since the molded product uses the resin composition for plating of the present invention, the molded product has excellent impact resistance. Further, when a plating treatment is implemented on the molded product, the resulting plated product shows excellent plating adhesion strength, is less likely to change in plating appearance in the hot/cold cycle, and shows excellent impact resistance as well.

[Plated Product]

The plated product includes the molded product described above and a plating film formed on at least a part of the surface of the molded product.

The plated product is obtained by subjecting the molded product to a plating treatment. The plating treatment method is not particularly limited, and examples thereof include an electroless plating method, a direct plating method, and a non-chrome plating method.

Further, before the plating treatment, it is preferable to perform an etching treatment with an etching solution such as a permanganate solution or a chromic acid solution.

Since the plated product is obtained by plating the molded product of the resin composition for plating of the present invention, the plated product shows excellent adhesion strength between the molded product and the plating film, is less likely to change in plating appearance in the hot/cold cycle, and shows excellent impact resistance as well.

The plated product can be suitably used for a wide variety of applications such as OA (office automation) equipment, information/communication equipment, electronic/electrical equipment, home electric appliances, automobiles, and construction.

EXAMPLES

Hereinbelow, the present invention is specifically described by way of Examples which should not be construed as limiting the present invention.

The various measurements and evaluations were performed in the Examples and Comparative Examples by respective methods as described below.

In the following description, the unit "parts" refers to "parts by weight" and the unit "%" refers to "% by mass", unless otherwise specified.

[Measurement and Evaluation Methods]

<Mass-Based Particle Size Distribution of Rubber Polymer>

Using a nano-size particle size distribution analyzer (Nanotrac UPA-EX150, manufactured by Nikkiso Co., Ltd.) that operates based on the principle of dynamic scattering theory, a mass-based particle size distribution was measured with respect to an aqueous diluted solution of the latex of a rubbery polymer, and the mass average particle size (μm) was determined from the obtained particle size distribution.

<Measurement of Graft Ratio of Graft Copolymer (A)>

Approximately 2.5 g of a dried powder of graft copolymer (A) was weighed, 60 mL of acetone was added thereto, and the resulting mixture was heated at 55° C. for 3 hours to carry out extraction into an acetone solution. Then, the resulting acetone solution was centrifuged at 8000 rpm (10,000 G) for 30 minutes, and the acetone-insoluble fraction was separated by filtration. The acetone-insoluble fraction was dried under a reduced pressure at 70° C. for 5 hours to measure the dry mass, and the graft ratio was calculated by the following formula (3). In the following formula (3), "m" is the mass (g) of the graft copolymer (A) before extraction (that is, the weighed graft copolymer (A)), "n" is the dry mass (g) of the acetone-insoluble fraction, and "L" is the rubber content (% by mass) of the graft copolymer.

$$\text{Graft ratio (\%)} = \{(n - m \times L)/(m \times L)\} \times 100 \tag{3}$$

<Measurement of Mass Average Molecular Weight (Mw) of Copolymer (B)>

A measurement was implemented using a GPC device (manufactured by Tosoh Corporation) with respect to a solution obtained by dissolving the copolymer (B) in tetrahydrofuran as a measurement sample, and a standard polystyrene-equivalent value of the mass average molecular weight was calculated.

<Measurement of Charpy Impact Strength>

Pellets of the resin composition for plating were injection-molded using an 80-ton injection molding machine ("J80ADS-110U", manufactured by The Japan Steel Works, Ltd.) to obtain a test piece (80 mm in length×10 mm in width×4 mm in thickness). The injection molding was performed at a molding temperature of 250° C., a mold temperature of 60° C., and an injection speed of 42 mm/sec.

The Charpy impact strength (notched) of the obtained test piece was measured at a measurement temperature of 23° C. in accordance with ISO 179, and the impact resistance was evaluated according to the following criteria.

3: Excellent with Charpy impact strength of 45 kJ/m² or higher.

2: No practical problem with Charpy impact strength of 40 kJ/m² or higher and lower than 45 kJ/m².

1: Below practically required level with Charpy impact strength of lower than 40 kJ/m².

<Measurement of Deflection Temperature Under Load>

Pellets of the resin composition for plating were injection-molded using an 80-ton injection molding machine ("J80ADS-110U", manufactured by The Japan Steel Works, Ltd.) to obtain a test piece (80 mm in length×10 mm in width×4 mm in thickness). The injection molding was performed at a molding temperature of 250° C., a mold temperature of 60° C., and an injection speed of 42 mm/sec.

With respect to the obtained test piece, the deflection temperature under load was measured under a load of 1.80 MPa with a flat width (4 mm thickness) in accordance with ISO 75, and the heat resistance was evaluated according to the following criteria.

3: Excellent with deflection temperature under load of 100° C. or higher.

2: No practical problem with deflection temperature under load of 90° C. or higher and lower than 100° C.

1: Below practically required level with deflection temperature under load of lower than 90° C.

<Evaluation of Fluidity (Spiral Flow)>

Using a spiral flow mold (15 mm in width×2 mm in thickness), pellets of the resin composition for plating were injection-molded by an 85-ton injection molding machine ("J85AD-110H", manufactured by The Japan Steel Works, Ltd.) at a cylinder temperature of 280° C., a mold temperature of 60° C., and an injection pressure of 100 MPa. The spiral flow length (mm) of the obtained molded product was measured, and the fluidity (spiral flow) was evaluated according to the following criteria.

3: Excellent material with spiral flow length of 300 mm or more.

2: No practical problem with spiral flow length of 250 mm or more and less than 300 mm.

1: Below practically required level with spiral flow length of less than 250 mm.

<Evaluation of Plating Adhesion Strength>

Pellets of the resin composition for plating were injection-molded using an 80-ton injection molding machine ("J80ADS-110U", manufactured by The Japan Steel Works, Ltd.) to obtain a test piece (90 mm in length×50 mm in width×3 mm in thickness). The injection molding was performed at a molding temperature of 250° C., a mold temperature of 60° C., and an injection speed of 5 mm/sec.

The obtained test piece was plated in a manner as described below, the plating film was peeled off in the vertical direction on a load measuring device to measure the strength therefor, and the plating adhesion strength was evaluated according to the following criteria.

3: Excellent with plating adhesion strength of 15 N/cm or more.

2: No practical problem with plating adhesion strength of 10 N/cm or more and less than 15 N/cm.

1: Below practically required level with plating adhesion strength of less than 10 N/cm, or due to failure of deposition of plating film on the entire surface of the test piece (no evaluation possible).

(Plating)

For the evaluation of the plating adhesion strength, the plating was carried out following the procedures (1) to (15) described below.

(1) delipidation→(2) washing with water→(3) etching→(4) washing with water→(5) acid treatment→(6) washing with water→(7) catalyst coating→(8) washing with water→(9) activation treatment→(10) washing with water→(11) chemical Ni plating→(12) washing with water→(13) electrocopper plating→(14) washing with water→(15) drying Conditions for Respective Procedures (1) Delipidation: Treatment at 50° C. for 5 minutes with a 50 mL/L solution of CRP cleaner (manufactured by Okuno Chemical Industry Co., Ltd.).

(2) Washing with water: Washing with water at 20° C. The conditions for the washing with water in and after the procedure (4) were the same as in the procedure (2).

(3) Etching: Etching treatment using a mixed solution of 400 g/L of chromic anhydride and 200 mL/L of sulfuric acid as an etching solution. The immersion was implemented at 68° C. for 15 minutes.

(5) Acid treatment: Immersion in 100 mL of 35% hydrochloric acid at 23° C. for 1 minute.

(7) Catalyst coating: immersion in a mixed solution (Pd—Sn colloid catalyst) of 40 mL/L of a CRP catalyst and 250 mL/L of 35% hydrochloric acid at 30° C. for 3 minutes.

(9) Activation treatment: Immersion in 100 mL of sulfuric acid at 40° C. for 3 minutes.

(11) Chemical Ni plating: Immersion in a mixed solution of 160 mL/L of chemical nickel A (manufactured by Okuno Chemical Industry Co., Ltd.) and 160 mL/L of chemical nickel B (manufactured by Okuno Chemical Industry Co., Ltd.) at 35° C. for 5 minutes to form a chemically plated film having a thickness of 0.5 μm.

(13) Electro-copper plating: Immersion in a mixed solution of 200 g/L of copper sulfate, 30 mL/L of sulfuric acid, and a brightener at 20° C. and a current density of 3 A/dm$^2$ for 60 minutes to form a copper plating film having a thickness of 35 μm.

(15) Drying: Drying at 80° C. for 2 hours.

<Evaluation of Hot/Cold Cycle Performance>

Pellets of the resin composition for plating were injection-molded using an 80-ton injection molding machine ("J80ADS-110U", manufactured by The Japan Steel Works, Ltd.) to obtain a test piece (100 mm in length×100 mm in width×3 mm in thickness). The injection molding was performed at a cylinder temperature of 250° C., a mold temperature of 60° C., and an injection speed of 50 mm/sec.

The obtained test piece was plated in a manner as described below, and a hot/cold cycle of [−35° C.×1 hour cooling and 90° C.×1 hour heating] was repeated 10 times so as to perform 10 hot/cold cycles in total. Then, the condition of the plating film of the plated product was visually observed, and the hot/cold cycle performance was evaluated according to the following criteria.

⊚ (3): Excellent with no morphological change such as swelling and/or peeling of plating on both the effective surface and the back surface of the plated product.

○ (2): No practical problem with no morphological change such as swelling and/or peeling of plating on the effective surface of the plated product though a slight morphological change such as swelling and/or peeling of plating occurred on the back surface of the plated product.

Δ (1): Below practically required level due to occurrence of morphological change such as swelling and/or peeling of plating on the effective surface of the plated product or failure of deposition of plating film on the entire surface of the test piece (no evaluation possible).

(Plating)

For the evaluation of the hot/cold cycle performance, the plating was carried out following the procedures (1) to (17) described below.

(1) delipidation→(2) washing with water→(3) etching→(4) washing with water→(5) acid treatment→(6) washing with water→(7) catalyst coating→(8) washing with water→(9) activation treatment→(10) washing with water→(11) chemical Ni plating→(12) washing with water→(13) electrocopper plating→(14) washing with water→(15) electro Ni plating→(16) washing with water→(17) electro Cr plating Conditions for Respective Procedures (1) Delipidation: Treatment at 50° C. for 5 minutes with CRP cleaner (manufactured by Okuno Chemical Industry Co., Ltd.).

(2) Washing with water: Washing with water at 20° C. The conditions for the washing with water in and after the procedure (4) were the same as in the procedure (2).

(3) Etching: Etching treatment using a mixed solution of 400 g/L of chromic anhydride and 200 mL/L of sulfuric acid as an etching solution. The immersion was implemented at 68° C. for 20 minutes.

(5) Acid treatment: Immersion in 100 mL of 35% hydrochloric acid at 23° C. for 1 minute.

(7) Catalyst coating: Immersion in a mixed solution (Pd—Sn colloid catalyst) of 40 mL/L of a CRP catalyst and 250 mL/L of 35% hydrochloric acid at 30° C. for 3 minutes.
(9) Activation treatment: Immersion in 100 mL of sulfuric acid at 40° C. for 3 minutes.
(11) Chemical Ni plating: Immersion in a mixed solution of 160 mL/L of chemical nickel A (manufactured by Okuno Chemical Industry Co., Ltd.) and 160 mL/L of chemical nickel B (manufactured by Okuno Chemical Industry Co., Ltd.) at 35° C. for 5 minutes to form a chemically plated film having a thickness of 0.5 μm.
(13) Electro-copper plating: Immersion in a mixed solution of 200 g/L of copper sulfate, 30 mL/L of sulfuric acid, and a brightener at 20° C. and a current density of 3 A/dm$^2$ for 20 minutes to form a copper plating film having a thickness of 20 μm.
(15) Electro-Ni plating: Immersion in a mixed solution of 200 g/L of nickel sulfate, 45 g/L of nickel chloride, 45 g/L of boric acid, and a brightener at 55° C. and a current density of 3 A/dm$^2$ for 15 minutes to form a nickel plating film having a thickness of 10 μm.
(17) Electro-Cr plating: Immersion in a mixed solution of 200 g/L of chromic anhydride, and 1.5 g/L of sulfuric acid at 45° C. and a current density of 15 A/dm$^2$ for 2 minutes to form a chrome plating film having a thickness of 0.3 μm.

<Comprehensive Evaluation>

In the above evaluation results, a product with a total score of 13 to 15 points was evaluated as "⊚" in the comprehensive evaluation, a product with a total score of 11 to 12 points was evaluated as "○" in the comprehensive evaluation, and a product with a total score of 10 points or less or a score of 1 point in any of the evaluation results was evaluated as "Δ" in the comprehensive evaluation.

[Production of Graft Copolymer (A)]

Synthesis Example 1

Production of Rubbery Polymer (g)

A reactor was charged with 150 parts of water, 3.3 parts of a potassium salt of beef tallow fatty acid, 0.14 parts of potassium hydroxide, 0.3 parts of sodium pyrophosphate, 0.20 parts of tert-dodecyl mercaptan, followed by addition of 100 parts of 1,3-butadiene, and the temperature was raised to 62° C. Then, 0.12 parts of potassium persulfate was injected to initiate polymerization. The polymerization reaction was carried out while raising the temperature to 75° C. over 10 hours. Further, after having allowed the polymerization reaction to proceed at 75° C. for 1 hour, 0.08 parts of sodium formaldehyde sulfoxylate was injected. After removing the remaining 1,3-butadiene, the resulting polymer was taken out to obtain a latex (solids content 35%) of a rubbery polymer. The mass average particle size of the obtained rubbery polymer was 0.08 μm.

To 100 parts (in terms of solids content) of the obtained rubbery polymer latex, 2 parts (in terms of solids content) of a latex (average particle size 0.11 μm) of a copolymer composed of 85% of n-butyl acrylate units and 15% of methacrylic acid units was added with stirring, and the stirring was continued for 30 minutes to obtain a latex of an enlarged butadiene rubbery polymer (g) having an average particle size of 0.28 μm.

Synthesis Example 2

Graft Copolymer (A-1-1)

180 parts of water (inclusive of water in the latex of rubbery polymer (g)), 70 parts (in terms of solids content) of the latex of rubbery polymer (g), and 0.13 parts of disproportionated potassium rosinate were added to a sealed reactor equipped with a reagent injection container, a cooling tube, a nitrogen substitution device, a jacket heater and a stirrer. While implementing nitrogen substitution, the liquid temperature inside the reactor was raised to 55° C. and this temperature was maintained for 30 minutes. Then, a solution obtained by dissolving 0.15 parts of sodium pyrophosphate, 0.008 parts of ferrous sulfate heptahydrate and 0.3 parts of glucose in 8 parts of ion-exchanged water was added. Then, a mixed solution of 7.5 parts of acrylonitrile, 22.5 parts of styrene, 0.07 parts of cumene hydroperoxide, and 0.09 parts of tert-dodecyl mercaptan was added dropwise over 5 hours to carry out a polymerization. After completion of the dropwise addition, the resulting mixture was stirred for 30 minutes while maintaining the internal temperature at 55° C., and then cooled to obtain a latex of a graft copolymer.

The obtained latex of the graft copolymer was diluted 1.25 times with distilled water and gradually added dropwise to a 3% aqueous sulfuric acid solution at 50° C. After completion of the dropwise addition of the whole amount, the temperature was raised to 90° C. and this temperature was maintained for 5 minutes to cause coagulation. Next, the coagulated product was centrifuged with a filter cloth, and then the resulting graft copolymer in the form of a wet powder was dried to obtain a graft copolymer (A-1-1).

The rubber content (X) of the obtained graft copolymer (A-1-1) was 70% by mass, and the graft ratio (Y) was 38.6%.

In this example, the charged amount of the rubbery polymer (g) was defined as the rubber content (X).

Synthesis Example 3

Graft Copolymer (A-1-2)

180 parts of water (inclusive of water in the latex of rubbery polymer (g)), 55 parts (in terms of solids content) of the latex of rubbery polymer (g), and 0.15 parts of disproportionated potassium rosinate were added to a sealed reactor equipped with a reagent injection container, a cooling tube, a nitrogen substitution device, a jacket heater and a stirrer. While implementing nitrogen substitution, the liquid temperature inside the reactor was raised to 55° C. and this temperature was maintained for 30 minutes. Then, a solution obtained by dissolving 0.15 parts of sodium pyrophosphate, 0.008 parts of ferrous sulfate heptahydrate and 0.3 parts of glucose in 8 parts of ion-exchanged water was added. Then, a mixed solution of 11.25 parts of acrylonitrile, 33.75 parts of styrene, 0.07 parts of cumene hydroperoxide, and 0.09 parts of tert-dodecyl mercaptan was added dropwise over 5 hours to carry out a polymerization. After completion of the dropwise addition, the resulting mixture was stirred for 30 minutes while maintaining the internal temperature at 55° C., and then cooled to obtain a latex of a graft copolymer.

The obtained latex of the graft copolymer was diluted 1.25 times with distilled water and gradually added dropwise to a 3% aqueous sulfuric acid solution at 50° C. After completion of the dropwise addition of the whole amount, the temperature was raised to 90° C. and this temperature was maintained for 5 minutes to cause coagulation. Next, the coagulated product was centrifuged with a filter cloth, and then the resulting graft copolymer in the form of a wet powder was dried to obtain a graft copolymer (A-1-2).

The rubber content (X) of the obtained graft copolymer (A-1-2) was 55% by mass, and the graft ratio (Y) was 73.6%.

Synthesis Example 4

Graft Copolymer (A-1-3)

1.80 parts of water (inclusive of water in the latex of rubbery polymer (g)), 70 parts (in terms of solids content) of the latex of rubbery polymer (g), and 0.2 parts of disproportionated potassium rosinate were added to a reactor equipped with a reagent injection container, a cooling tube, a jacket heater and a stirrer. The liquid temperature inside the reactor was raised to 60° C., followed by addition of a solution obtained by dissolving 0.2 parts of sodium pyrophosphate, 0.01 part of ferrous sulfate heptahydrate and 0.3 parts of glucose in 8 parts of ion-exchanged water. Then, a mixed solution of 7.5 parts of acrylonitrile, 22.5 parts of styrene, 0.08 parts of cumene hydroperoxide, and 0.09 parts of tert-dodecyl mercaptan was added dropwise over 2 hours to carry out a polymerization. After completion of the dropwise addition, the resulting mixture was stirred for 30 minutes while maintaining the internal temperature at 60° C., and then cooled to obtain a latex of a graft copolymer.

The obtained latex of the graft copolymer was diluted 1.25 times with distilled water and gradually added dropwise to a 3% aqueous sulfuric acid solution at 50° C. After completion of the dropwise addition of the whole amount, the temperature was raised to 90° C. and this temperature was maintained for 5 minutes to cause coagulation. Next, the coagulated product was centrifuged with a filter cloth, and then the resulting graft copolymer in the form of a wet powder was dried to obtain a graft copolymer (A-1-3).

The rubber content (X) of the obtained graft copolymer (A-1-3) was 70% by mass, and the graft ratio (Y) was 34.3%.

Synthesis Example 5

Graft Copolymer (A-1-4)

180 parts of water (inclusive of water in the latex of rubbery polymer (g)), 55 parts (in terms of solids content) of the latex of rubbery polymer (g), and 0.2 parts of disproportionated potassium rosinate were added to a reactor equipped with a reagent injection container, a cooling tube, a jacket heater and a stirrer. The liquid temperature inside the reactor was raised to 60° C. and this temperature was maintained for 30 minutes. Then, a solution obtained by dissolving 0.15 parts of sodium pyrophosphate, 0.01 part of ferrous sulfate heptahydrate and 0.3 parts of glucose in 8 parts of ion-exchanged water was added. Then, a mixed solution of 11.25 parts of acrylonitrile, 33.75 parts of styrene, 0.1 parts of cumene hydroperoxide, and 0.12 parts of tert-dodecyl mercaptan was added dropwise over 3.5 hours to carry out a polymerization. After completion of the dropwise addition, the resulting mixture was stirred for 30 minutes while maintaining the internal temperature at 60° C., and then cooled to obtain a latex of a graft copolymer.

The obtained latex of the graft copolymer was diluted 1.25 times with distilled water and gradually added dropwise to a 3% aqueous sulfuric acid solution at 50° C. After completion of the dropwise addition of the whole amount, the temperature was raised to 90° C. and this temperature was maintained for 5 minutes to cause coagulation. Next, the coagulated product was centrifuged with a filter cloth, and then the resulting graft copolymer in the form of a wet powder was dried to obtain a graft copolymer (A-1-4).

The rubber content (X) of the obtained graft copolymer (A-1-4) was 55% by mass, and the graft ratio (Y) was 65.5%.

Synthesis Example 6

Graft Copolymer (A-1-5)

180 parts of water (inclusive of water in the latex of rubbery polymer (g)), 60 parts (in terms of solids content) of the latex of rubbery polymer (g), and 0.18 parts of disproportionated potassium rosinate were added to a sealed reactor equipped with a reagent injection container, a cooling tube, a nitrogen substitution device, a jacket heater and a stirrer. While implementing nitrogen substitution, the liquid temperature inside the reactor was raised to 55° C. and this temperature was maintained for 30 minutes. Then, a solution obtained by dissolving 0.15 parts of sodium pyrophosphate, 0.008 parts of ferrous sulfate heptahydrate and 0.3 parts of glucose in 8 parts of ion-exchanged water was added. Then, a mixed solution of 10 parts of acrylonitrile, 30 parts of styrene, 0.1 parts of cumene hydroperoxide, and 0.12 parts of tert-dodecyl mercaptan was added dropwise over 4.5 hours to carry out a polymerization. After completion of the dropwise addition, the resulting mixture was stirred for 30 minutes while maintaining the internal temperature at 55° C., and then cooled to obtain a latex of a graft copolymer.

The obtained latex of the graft copolymer was diluted 1.25 times with distilled water and gradually added dropwise to a 3% aqueous sulfuric acid solution at 50° C. After completion of the dropwise addition of the whole amount, the temperature was raised to 90° C. and this temperature was maintained for 5 minutes to cause coagulation. Next, the coagulated product was centrifuged with a filter cloth, and then the resulting graft copolymer in the form of a wet powder was dried to obtain a graft copolymer (A-1-5).

The rubber content (X) of the obtained graft copolymer (A-1-5) was 60% by mass, and the graft ratio (Y) was 56.7%.

Synthesis Example 7

Graft Copolymer (A-2-1)

180 parts of water (inclusive of water in the latex of rubbery polymer (g)), 50 parts (in terms of solids content) of the latex of rubbery polymer (g), and 0.18 parts of disproportionated potassium rosinate were added to a sealed reactor equipped with a reagent injection container, a cooling tube, a nitrogen substitution device, a jacket heater and a stirrer. While implementing nitrogen substitution, the liquid temperature inside the reactor was raised to 55° C. and this temperature was maintained for 30 minutes. Then, a solution obtained by dissolving 0.2 parts of sodium pyrophosphate, 0.01 parts of ferrous sulfate heptahydrate and 0.3 parts of glucose in 8 parts of ion-exchanged water was added. Then, a mixed solution of 12.5 parts of acrylonitrile, 37.5 parts of styrene, 0.1 parts of cumene hydroperoxide, and 0.13 parts of tert-dodecyl mercaptan was added dropwise over 2 hours to carry out a polymerization. After completion of the dropwise addition, the resulting mixture was stirred for 30 minutes while maintaining the internal temperature at 55° C., and then cooled to obtain a latex of a graft copolymer.

The obtained latex of the graft copolymer was diluted 1.25 times with distilled water and gradually added dropwise to a 3% aqueous sulfuric acid solution at 50° C. After completion of the dropwise addition of the whole amount, the temperature was raised to 90° C. and this temperature was maintained for 5 minutes to cause coagulation. Next, the coagulated product was centrifuged with a filter cloth, and then the resulting graft copolymer in the form of a wet powder was dried to obtain a graft copolymer (A-2-1).

The rubber content (X) of the obtained graft copolymer (A-2-1) was 50% by mass, and the graft ratio (Y) was 90.0%.

Synthesis Example 8

Graft copolymer (A-2-2)

180 parts of water (inclusive of water in the latex of rubbery polymer (g)), 70 parts (in terms of solids content) of the latex of rubbery polymer (g), and 0.25 parts of disproportionated potassium rosinate were added to a reactor equipped with a reagent injection container, a cooling tube, a jacket heater and a stirrer. The liquid temperature inside the reactor was raised to 65° C., followed by addition of a solution obtained by dissolving 0.2 parts of sodium pyrophosphate, 0.01 part of ferrous sulfate heptahydrate and 0.3 parts of glucose in 8 parts of ion-exchanged water.

Then, a mixed solution of 7.5 parts of acrylonitrile, 22.5 parts of styrene, 0.13 parts of cumene hydroperoxide, and 0.09 parts of tert-dodecyl mercaptan was added dropwise over 2 hours to carry out a polymerization. After completion of the dropwise addition, the resulting mixture was stirred for 30 minutes while maintaining the internal temperature at 65° C., and then cooled to obtain a latex of a graft copolymer.

The obtained latex of the graft copolymer was diluted 1.25 times with distilled water and gradually added dropwise to a 3% aqueous sulfuric acid solution at 50° C. After completion of the dropwise addition of the whole amount, the temperature was raised to 90° C. and this temperature was maintained for 5 minutes to cause coagulation. Next, the coagulated product was centrifuged with a filter cloth, and then the resulting graft copolymer in the form of a wet powder was dried to obtain a graft copolymer (A-2-2).

The rubber content (X) of the obtained graft copolymer (A-2-2) was 70% by mass, and the graft ratio (Y) was 30.0%.

Synthesis Example 9

Graft Copolymer (A-2-3)

180 parts of water (inclusive of water in the latex of rubbery polymer (g)), 50 parts (in terms of solids content) of the latex of rubbery polymer (g), and 0.25 parts of disproportionated potassium rosinate were added to a reactor equipped with a reagent injection container, a cooling tube, a jacket heater and a stirrer. The liquid temperature inside the reactor was raised to 65° C., followed by addition of a solution obtained by dissolving 0.2 parts of sodium pyrophosphate, 0.01 part of ferrous sulfate heptahydrate and 0.3 parts of glucose in 8 parts of ion-exchanged water.

Then, a mixed solution of 12.5 parts of acrylonitrile, 37.5 parts of styrene, 0.23 parts of cumene hydroperoxide, and 0.15 parts of tert-dodecyl mercaptan was added dropwise over 2.5 hours to carry out a polymerization. After completion of the dropwise addition, the resulting mixture was stirred for 30 minutes while maintaining the internal temperature at 65° C., and then cooled to obtain a latex of a graft copolymer.

The obtained latex of the graft copolymer was diluted 1.25 times with distilled water and gradually added dropwise to a 3% aqueous sulfuric acid solution at 50° C. After completion of the dropwise addition of the whole amount, the temperature was raised to 90° C. and this temperature was maintained for 5 minutes to cause coagulation. Next, the coagulated product was centrifuged with a filter cloth, and then the resulting graft copolymer in the form of a wet powder was dried to obtain a graft copolymer (A-2-3).

The rubber content (X) of the obtained graft copolymer (A-2-3) was 50% by mass, and the graft ratio (Y) was 70.0%.

Synthesis Example 10

Graft Copolymer (A-2-4)

180 parts of water (inclusive of water in the latex of rubbery polymer (g)), 45 parts (in terms of solids content) of the latex of rubbery polymer (g), and 0.25 parts of disproportionated potassium rosinate were added to a reactor equipped with a reagent injection container, a cooling tube, a jacket heater and a stirrer. The liquid temperature inside the reactor was raised to 65° C., followed by addition of a solution obtained by dissolving 0.2 parts of sodium pyrophosphate, 0.01 part of ferrous sulfate heptahydrate and 0.3 parts of glucose in 8 parts of ion-exchanged water.

Then, a mixed solution of 13.75 parts of acrylonitrile, 41.25 parts of styrene, 0.23 parts of cumene hydroperoxide, and 0.16 parts of tert-dodecyl mercaptan was added dropwise over 2.5 hours to carry out a polymerization. After completion of the dropwise addition, the resulting mixture was stirred for 30 minutes while maintaining the internal temperature at 65° C., and then cooled to obtain a latex of a graft copolymer.

The obtained latex of the graft copolymer was diluted 1.25 times with distilled water and gradually added dropwise to a 3% aqueous sulfuric acid solution at 50° C. After completion of dropwise addition of the whole amount, the temperature was raised to 90° C. and this temperature was held for 5 minutes to cause coagulation. Next, the coagulated product was centrifuged with a filter cloth, and then the resulting graft copolymer in the form of a wet powder was dried to obtain a graft copolymer (A-2-4).

The rubber content (X) of the obtained graft copolymer (A-2-4) was 45% by mass, and the graft ratio (Y) was 85.6%.

Synthesis Example 11

Graft Copolymer (A-3-1)

180 parts of water (inclusive of water in the latex of rubbery polymer (g)), 40 parts (in terms of solids content) of the latex of rubbery polymer (g), and 0.18 parts of disproportionated potassium rosinate were added to a sealed reactor equipped with a reagent injection container, a cooling tube, a nitrogen substitution device, a jacket heater and a stirrer. While implementing nitrogen substitution, the liquid temperature inside the reactor was raised to 55° C. and this temperature was held for 30 minutes. Then, a solution obtained by dissolving 0.2 parts of sodium pyrophosphate, 0.008 parts of ferrous sulfate heptahydrate and 0.3 parts of glucose in 8 parts of ion-exchanged water was added. Then, a mixed solution of 15 parts of acrylonitrile, 45 parts of styrene, 0.07 parts of cumene hydroperoxide, and 0.09 parts of tert-dodecyl mercaptan was added dropwise over 5 hours to carry out a polymerization. After completion of the dropwise addition, the resulting mixture was stirred for 30 minutes while maintaining the internal temperature at 55° C., and then cooled to obtain a latex of a graft copolymer.

The obtained latex of the graft copolymer was diluted 1.25 times with distilled water and gradually added dropwise to a 3% aqueous sulfuric acid solution at 50° C. After completion of the dropwise addition of the whole amount, the temperature was raised to 90° C. and this temperature was maintained for 5 minutes to cause coagulation. Next, the coagulated product was centrifuged with a filter cloth, and then the resulting graft copolymer in the form of a wet powder was dried to obtain a graft copolymer (A-3-1).

The rubber content (X) of the obtained graft copolymer (A-3-1) was 40% by mass, and the graft ratio (Y) was 135.0%.

Synthesis Example 12

Graft Copolymer (A-3-2)

180 parts of water (inclusive of water in the latex of rubbery polymer (g)), 70 parts (in terms of solids content) of the latex of rubbery polymer (g), and 0.3 parts of disproportionated potassium rosinate were added to a reactor equipped with a reagent injection container, a cooling tube, a jacket heater and a stirrer. The liquid temperature inside the reactor was raised to 65° C., followed by addition of a solution obtained by dissolving 0.2 parts of sodium pyrophosphate, 0.01 part of ferrous sulfate heptahydrate and 0.3 parts of glucose in 8 parts of ion-exchanged water. Then, a mixed solution of 7.5 parts of acrylonitrile, 22.5 parts of styrene, 0.13 parts of cumene hydroperoxide, and 0.09 parts of tert-dodecyl mercaptan was added dropwise over 2 hours to carry out a polymerization. After completion of the dropwise addition, the resulting mixture was stirred for 30 minutes while maintaining the internal temperature at 65° C., and then cooled to obtain a latex of a graft copolymer.

The obtained latex of the graft copolymer was diluted 1.25 times with distilled water and gradually added dropwise to a 3% aqueous sulfuric acid solution at 50° C. After completion of the dropwise addition of the whole amount, the temperature was raised to 90° C. and this temperature was maintained for 5 minutes to cause coagulation. Next, the coagulated product was centrifuged with a filter cloth, and then the resulting graft copolymer in the form of a wet powder was dried to obtain a graft copolymer (A-3-2).

The rubber content (X) of the obtained graft copolymer (A-3-2) was 70% by mass, and the graft ratio (Y) was 25.7%.

Synthesis Example 13

Graft Copolymer (A-3-3)

180 parts of water (inclusive of water in the latex of rubbery polymer (g)), 55 parts (in terms of solids content) of the latex of rubbery polymer (g), and 0.3 parts of disproportionated potassium rosinate were added to a reactor equipped with a reagent injection container, a cooling tube, a jacket heater and a stirrer. The liquid temperature inside the reactor was raised to 65° C., followed by addition of a solution obtained by dissolving 0.2 parts of sodium pyrophosphate, 0.01 part of ferrous sulfate heptahydrate and 0.3 parts of glucose in 8 parts of ion-exchanged water. Then, a mixed solution of 11.25 parts of acrylonitrile, 33.75 parts of styrene, 0.2 parts of cumene hydroperoxide, and 0.13 parts of tert-dodecyl mercaptan was added dropwise over 2 hours to carry out a polymerization. After completion of the dropwise addition, the resulting mixture was stirred for 30 minutes while maintaining the internal temperature at 65° C., and then cooled to obtain a latex of a graft copolymer.

The obtained latex of the graft copolymer was diluted 1.25 times with distilled water and gradually added dropwise to a 3% aqueous sulfuric acid solution at 50° C. After completion of the dropwise addition of the whole amount, the temperature was raised to 90° C. and this temperature was maintained for 5 minutes to cause coagulation. Next, the coagulated product was centrifuged with a filter cloth, and then the resulting graft copolymer in the form of a wet powder was dried to obtain a graft copolymer (A-3-3).

The rubber content (X) of the obtained graft copolymer (A-3-3) was 55% by mass, and the graft ratio (Y) was 49.1%.

Synthesis Example 14

Graft Copolymer (A-3-4)

180 parts of water (inclusive of water in the latex of rubbery polymer (g)), 40 parts (in terms of solids content) of the latex of rubbery polymer (g), and 0.3 parts of disproportionated potassium rosinate were added to a reactor equipped with a reagent injection container, a cooling tube, a jacket heater and a stirrer. The liquid temperature inside the reactor was raised to 65° C., followed by addition of a solution obtained by dissolving 0.2 parts of sodium pyrophosphate, 0.01 part of ferrous sulfate heptahydrate and 0.3 parts of glucose in 8 parts of ion-exchanged water. Then, a mixed solution of 15 parts of acrylonitrile, 45 parts of styrene, 0.27 parts of cumene hydroperoxide, and 0.17 parts of tert-dodecyl mercaptan was added dropwise over 2 hours to carry out a polymerization. After completion of the dropwise addition, the resulting mixture was stirred for 30 minutes while maintaining the internal temperature at 65° C., and then cooled to obtain a latex of a graft copolymer.

The obtained latex of the graft copolymer was diluted 1.25 times with distilled water and gradually added dropwise to a 3% aqueous sulfuric acid solution at 50° C. After completion of the dropwise addition of the whole amount, the temperature was raised to 90° C. and this temperature was maintained for 5 minutes to cause coagulation. Next, the coagulated product was centrifuged with a filter cloth, and then the resulting graft copolymer in the form of a wet powder was dried to obtain a graft copolymer (A-3-4).

The rubber content (X) of the obtained graft copolymer (A-3-4) was 40% by mass, and the graft ratio (Y) was 90.0%.

[Production of Graft Copolymer (B)]

Synthesis Example 15

Copolymer (B-1)

A reactor was charged with a monomer mixture composed of 125 parts of water, 0.4 parts of calcium phosphate, 0.003 parts of potassium alkenylsuccinate, 0.05 parts of 1,1,3,3-tetramethylbutylperoxy-2-ethylhexanoate, 0.04 parts of 1 1-di(tert-hexylperoxy)cyclohexane, 0.04 parts of tert-butylperoxy-2-ethylhexyl carbonate, 0.85 parts of tert-dodecyl mercaptan, 23 parts of acrylonitrile, and 77 parts of styrene, to carry out a reaction. The reaction was carried out while sequentially adding portions of the water, the acrylonitrile and the styrene, and heating to raise the temperature from an initial temperature of 65° C. over 6.5 hours to 125° C. Then, the reaction was continued at 125° C. for 1 hour to obtain a slurry of a copolymer (B-1). After cooling, the slurry was centrifugally dehydrated to obtain the copolymer (B-1). The mass average molecular weight of the obtained copolymer (B-I) was 60,000.

Synthesis Example 16

Copolymer (B-2)

A copolymer (B-2) was obtained in the same manner as in Synthesis Example 15, except that the amount of acrylonitrile was changed to 26 parts, the amount of styrene was changed to 74 parts, and the amount of tert-dodecyl mercaptan was changed to 0.45 parts. The mass average molecular weight of the obtained copolymer (B-2) was 115,000.

Synthesis Example 17

Copolymer (B-3)

A copolymer (B-3) was obtained in the same manner as in Synthesis Example 15, except that the amount of acrylonitrile was changed to 32 parts, the amount of styrene was changed to 68 parts, and the amount of tert-dodecyl mercaptan was changed to 0.65 parts. The mass average molecular weight of the obtained copolymer (B-3) was 89,000.

[Polycarbonate Resin (P)]

The polycarbonate resins (P) used are as follows.
P-1: "Iupilon H3000F", manufactured by Mitsubishi Engineering-Plastics Corporation (viscosity average molecular weight (Mv): 18,000).
P-2: "Iupilon S2000F", manufactured by Mitsubishi Engineering-Plastics Corporation (viscosity average molecular weight (Mv): 22,000).

Examples 1 to 21 and Comparative Examples 1 to 11

The graft copolymer (A), the copolymer (B), and the polycarbonate resin (P) were mixed at the ratios (parts by mass) shown in Tables 1 to 6 to prepare a resin composition for plating.

The obtained resin composition for plating was melt-kneaded at a temperature of 200° C. using a 30 mm twin-screw extruder ("TEX30α", manufactured by Japan Steel Works, Ltd.), and was pelletized to obtain pellets of the resin composition.

The rubber content (Z) in the plating resin composition in each of the Examples and Comparative Examples was calculated from the rubber content (X) in the graft copolymer (A) and the blending amount of the graft copolymer (A). The results are shown in Tables 1 to 6.

Further, with respect to the plating resin composition obtained in each of the Examples and Comparative Examples, the Charpy impact strength and the deflection temperature under load were measured, and the spiral flow, the plating adhesion strength, and the hot/cold cycle performance were evaluated. The results are shown in Tables 1 to 6.

The blanks in Tables 1 to 6 indicate that the relevant component was not blended (blending amount: 0 parts by mass).

TABLE 1

| | | | Example | | | | | |
|---|---|---|---|---|---|---|---|---|
| | | | 1 | 2 | 3 | 4 | 5 | 6 |
| Graft copolymer (A) [Part by mass] | A-1-1 | | 21 | 21 | | | | |
| | A-1-2 | | | | 27 | 27 | | |
| | A-1-3 | | | | | | 21 | 21 |
| | A-1-4 | | | | | | | |
| | A-1-5 | | | | | | | |
| | A-2-1 | | | | | | | |
| | A-2-2 | | | | | | | |
| | A-2-3 | | | | | | | |
| | A-2-4 | | | | | | | |
| | A-3-1 | | | | | | | |
| | A-3-2 | | | | | | | |
| | A-3-3 | | | | | | | |
| | A-3-4 | | | | | | | |
| Copolymer (B) [Part by mass] | B-1 | | 9 | 39 | 3 | 33 | 9 | 39 |
| | B-2 | | | | | | | |
| | B-3 | | | | | | | |
| Polycarbonate resin (P) [Part by mass] | P-1 | | 70 | | 70 | | 70 | |
| | P-2 | | | 40 | | 40 | | 40 |
| Rubber content(Z) in resin composition for plating | | % by mass | 14.7 | 14.7 | 14.9 | 14.9 | 14.7 | 14.7 |
| Rubber content (X) in graft copolymer (A) | | % by mass | 70 | 70 | 55 | 55 | 70 | 70 |
| Graft ratio (Y) of graft copolymer (A) | | % | 38.6 | 38.6 | 73.6 | 73.6 | 34.3 | 34.3 |
| −0.041X | | | −2.87 | −2.87 | −2.26 | −2.26 | −2.87 | −2.87 |
| $793e^{-0.041X}$ | | | 45.0 | 45.0 | 83.2 | 83.2 | 45.0 | 45.0 |
| $515e^{-0.041X}$ | | | 29.2 | 29.2 | 54.0 | 54.0 | 29.2 | 29.2 |
| $594e^{-0.041X}$ | | | 33.7 | 33.7 | 62.3 | 62.3 | 33.7 | 33.7 |
| Charpy impact strength | | kJ/m² | 45 | 48 | 45 | 49 | 46 | 48 |
| | | Evaluation | 3 | 3 | 3 | 3 | 3 | 3 |
| Deflection temperature | | ° C. | 104 | 96 | 103 | 96 | 104 | 95 |
| | | Evaluation | 3 | 2 | 3 | 2 | 3 | 2 |
| Spiral flow | | mm | 291 | 382 | 276 | 371 | 289 | 378 |
| | | Evaluation | 2 | 3 | 2 | 3 | 2 | 3 |

TABLE 1-continued

|  |  | Example |  |  |  |  |  |
|---|---|---|---|---|---|---|---|
|  |  | 1 | 2 | 3 | 4 | 5 | 6 |
| Plating adhesion strength | N/cm | 15.7 | 15.6 | 15.6 | 15.4 | 15.8 | 15.5 |
|  | Evaluation | 3 | 3 | 3 | 3 | 3 | 3 |
| Hot/cold cycle performance | Evaluation | ◎ | ○ | ◎ | ○ | ◎ | ○ |
|  |  | 3 | 2 | 3 | 2 | 3 | 2 |
| Comprehensive evaluation | Point | 14 | 13 | 14 | 13 | 14 | 13 |
|  | Grade | ◎ | ◎ | ◎ | ◎ | ◎ | ◎ |

TABLE 2

|  |  | Example |  |  |  |  |  |
|---|---|---|---|---|---|---|---|
|  |  | 7 | 8 | 9 | 10 | 11 | 12 |
| Graft copolymer (A) | A-1-1 |  |  |  |  |  |  |
| [Part by mass] | A-1-2 |  |  |  |  |  |  |
|  | A-1-3 |  |  |  |  |  |  |
|  | A-1-4 | 27 | 27 |  |  |  |  |
|  | A-1-5 |  |  | 25 | 25 | 25 | 25 |
|  | A-2-1 |  |  |  |  |  |  |
|  | A-2-2 |  |  |  |  |  |  |
|  | A-2-3 |  |  |  |  |  |  |
|  | A-2-4 |  |  |  |  |  |  |
|  | A-3-1 |  |  |  |  |  |  |
|  | A-3-2 |  |  |  |  |  |  |
|  | A-3-3 |  |  |  |  |  |  |
|  | A-3-4 |  |  |  |  |  |  |
| Copolymer (B) | B-1 | 3 | 33 | 5 | 35 |  |  |
| [Part by mass] | B-2 |  |  |  |  | 5 |  |
|  | B-3 |  |  |  |  |  | 5 |
| Polycarbonate resin (P) | P-1 | 70 |  | 70 |  | 70 | 70 |
| [Part by mass] | P-2 |  | 40 |  | 40 |  |  |
| Rubber content (Z) in resin composition for plating | % by mass | 14.9 | 14.9 | 15.0 | 15.0 | 15.0 | 15.0 |
| Rubber content (X) in graft copolymer (A) | % by mass | 55 | 55 | 60 | 60 | 60 | 60 |
| Graft ratio (Y) of graft copolymer (A) | % | 65.5 | 65.5 | 56.7 | 56.7 | 56.7 | 56.7 |
| $-0.041X$ |  | −2.26 | −2.26 | −2.46 | −2.46 | −2.46 | −2.46 |
| $793e^{-0.041X}$ |  | 83.2 | 83.2 | 67.7 | 67.7 | 67.7 | 67.7 |
| $515e^{-0.041X}$ |  | 54.0 | 54.0 | 44.0 | 44.0 | 44.0 | 44.0 |
| $594e^{-0.041X}$ |  | 62.3 | 62.3 | 50.7 | 50.7 | 50.7 | 50.7 |
| Charpy impact strength | kJ/m$^2$ | 45 | 46 | 46 | 47 | 48 | 49 |
|  | Evaluation | 3 | 3 | 3 | 3 | 3 | 3 |
| Deflection temperature | °C. | 105 | 96 | 104 | 96 | 104 | 104 |
|  | Evaluation | 3 | 2 | 3 | 2 | 3 | 3 |
| Spiral flow | mm | 275 | 369 | 282 | 377 | 277 | 278 |
|  | Evaluation | 2 | 3 | 2 | 3 | 2 | 2 |
| Plating adhesion strength | N/cm | 15.6 | 15.8 | 15.8 | 15.7 | 16.2 | 15.7 |
|  | Evaluation | 3 | 3 | 3 | 3 | 3 | 3 |
| Hot/cold cycle performance | Evaluation | ◎ | ○ | ◎ | ○ | ◎ | ◎ |
|  |  | 3 | 2 | 3 | 2 | 3 | 3 |
| Comprehensive evaluation | Point | 14 | 13 | 14 | 13 | 14 | 14 |
|  | Grade | ◎ | ◎ | ◎ | ◎ | ◎ | ◎ |

TABLE 3

|  |  | Example |  |  |  |  |
|---|---|---|---|---|---|---|
|  |  | 13 | 14 | 15 | 16 | 17 |
| Graft copolymer (A) | A-1-1 |  |  |  |  |  |
| [Part by mass] | A-1-2 |  |  |  |  |  |
|  | A-1-3 |  |  |  |  |  |
|  | A-1-4 |  |  |  |  |  |
|  | A-1-5 |  |  |  |  |  |
|  | A-2-1 | 30 |  |  |  |  |
|  | A-2-2 |  | 21 | 21 |  |  |
|  | A-2-3 |  |  |  | 30 |  |
|  | A-2-4 |  |  |  |  | 33 |
|  | A-3-1 |  |  |  |  |  |

TABLE 3-continued

|  |  | Example |  |  |  |  |
|---|---|---|---|---|---|---|
|  |  | 13 | 14 | 15 | 16 | 17 |
|  | A-3-2 |  |  |  |  |  |
|  | A-3-3 |  |  |  |  |  |
|  | A-3-4 |  |  |  |  |  |
| Copolymer (B) | B-1 | 30 | 39 |  | 30 | 27 |
| [Part by mass] | B-2 |  |  |  |  |  |
|  | B-3 |  |  |  |  |  |
| Polycarbonate resin (P) | P-1 |  |  | 70 |  |  |
| [Part by mass] | P-2 | 40 | 40 |  | 40 | 40 |
| Rubber content (Z) in resin composition for plating | % by mass | 15.0 | 14.7 | 14.7 | 15.0 | 14.9 |
| Rubber content (X) in graft copolymer (A) | % by mass | 50 | 70 | 70 | 50 | 45 |
| Graft ratio (Y) of graft copolymer (A) | % | 90.0 | 30.0 | 30.0 | 70.0 | 85.6 |
| $-0.041X$ |  | −2.05 | 2.87 | 2.87 | 2.05 | 1.85 |
| $793e^{-0.041X}$ |  | 102.1 | 45.0 | 45.0 | 102.1 | 125. |
| $515e^{-0.041X}$ |  | 66.3 | 29.2 | 29.2 | 66.3 | 81.4 |
| $594e^{-0.041X}$ |  | 76.5 | 33.7 | 33.7 | 76.5 | 93.9 |
| Charpy impact strength | kJ/m² | 47 | 46 | 47 | 45 | 46 |
|  | Evaluation | 3 | 3 | 3 | 3 | 3 |
| Deflection temperature | ° C. | 95 | 96 | 103 | 95 | 94 |
|  | Evaluation | 2 | 2 | 3 | 2 | 2 |
| Spiral flow | mm | 372 | 381 | 285 | 372 | 367 |
|  | Evaluation | 3 | 3 | 2 | 3 | 3 |
| Plating adhesion strength | N/cm | 12.1 | 12.3 | 12.5 | 12.5 | 12.4 |
|  | Evaluation | 2 | 2 | 2 | 2 | 2 |
| Hot/cold cycle performance | Evaluation | ○ | ○ | ○ | ○ | ○ |
|  |  | 2 | 2 | 2 | 2 | 2 |
| Comprehensive evaluation | Point | 12 | 12 | 12 | 12 | 12 |
|  |  | ○ | ○ | ○ | ○ | ○ |

TABLE 4

|  |  | Example |  |  |  |
|---|---|---|---|---|---|
|  |  | 18 | 19 | 20 | 21 |
| Graft copolymer (A) | A-1-1 |  |  |  |  |
| [Part by mass] | A-1-2 |  |  |  |  |
|  | A-1-3 |  |  |  |  |
|  | A-1-4 |  |  |  |  |
|  | A-1-5 | 17 | 17 | 30 | 30 |
|  | A-2-1 |  |  |  |  |
|  | A-2-2 |  |  |  |  |
|  | A-2-3 |  |  |  |  |
|  | A-2-4 |  |  |  |  |
|  | A-3-1 |  |  |  |  |
|  | A-3-2 |  |  |  |  |
|  | A-3-3 |  |  |  |  |
|  | A-3-4 |  |  |  |  |
| Copolymer (B) | B-1 | 13 | 43 |  | 30 |
| [Part by mass] | B-2 |  |  |  |  |
|  | B-3 |  |  |  |  |
| Polycarbonate resin (P) | P-1 | 70 |  | 70 |  |
| [Part by mass] | P-2 |  | 40 |  | 40 |
| Rubber content (Z) in resin composition for plating | % by mass | 10.2 | 10.2 | 18.0 | 18.0 |
| Rubber content (X) in graft copolymer (A) | % by mass | 60 | 60 | 60 | 60 |
| Graft ratio (Y) of graft copolymer (A) | % | 56.7 | 56.7 | 56.7 | 56.7 |
| $-0.041X$ |  | 2.46 | 2.46 | 2.46 | 2.46 |
| $793e^{-0.041X}$ |  | 67.7 | 67.7 | 67.7 | 67.7 |
| $515e^{-0.041X}$ |  | 44.0 | 44.0 | 44.0 | 44.0 |
| $594e^{-0.041X}$ |  | 50.7 | 50.7 | 50.7 | 50.7 |
| Charpy impact strength | kJ/m² | 42 | 43 | 49 | 51 |
|  | Evaluation | 2 | 2 | 3 | 3 |
| Deflection temperature | ° C. | 108 | 97 | 102 | 93 |
|  | Evaluation | 3 | 2 | 3 | 2 |
| Spiral flow | mm | 310 | 402 | 252 | 348 |
|  | Evaluation | 3 | 3 | 2 | 3 |
| Plating adhesion strength | N/cm | 15.1 | 15.3 | 17.3 | 16.5 |
|  | Evaluation | 3 | 3 | 3 | 3 |
| Hot/cold cycle performance | Evaluation | ◎ | ◎ | ○ | ◎ |
|  |  | 3 | 3 | 2 | 3 |
| Comprehensive evaluation | Point | 14 | 13 | 13 | 14 |
|  | Grade | ◎ | ◎ | ◎ | ◎ |

TABLE 5

| | | Comparative Example | | | | | |
|---|---|---|---|---|---|---|---|
| | | 1 | 2 | 3 | 4 | 5 | 6 |
| Graft copolymer (A) [Part by mass] | A-1-1 | | | | | | |
| | A-1-2 | | | | | | |
| | A-1-3 | | | | | | |
| | A-1-4 | | | | | | |
| | A-1-5 | | | | | | |
| | A-2-1 | | | | | | |
| | A-2-2 | | | | | | |
| | A-2-3 | | | | | | |
| | A-2-4 | | | | | | |
| | A-3-1 | 38 | | | | | |
| | A-3-2 | | 21 | 21 | | | |
| | A-3-3 | | | | 27 | 27 | |
| | A-3-4 | | | 9 | | | 38 |
| Copolymer (B) [Part by mass] | B-1 | 22 | | 39 | 3 | 33 | 22 |
| | B-2 | | | | | | |
| | B-3 | | | | | | |
| Polycarbonate resin(P) [Part by mass] | P-1 | | 70 | 40 | 70 | | |
| | P-2 | 40 | | | | 40 | 40 |
| Rubber content (Z) in resin composition for plating | % by mass | 12.0 | 15.2 | 14.7 | 14.9 | 14.9 | 15.2 |
| Rubber content (X) in graft copolymer (A) | % by mass | 40 | 70 | 70 | 55 | 55 | 40 |
| Graft ratio (Y) of graft copolymer (A) | % | 135.0 | 25.7 | 25.7 | 49.1 | 49.1 | 90.0 |
| $-0.041X$ | | −1.64 | −2.87 | −2.87 | −2.26 | −2.26 | −1.64 |
| $793e^{-0.041X}$ | | 153.8 | 45.0 | 45.0 | 83.2 | 83.2 | 153.8 |
| $515e^{-0.041X}$ | | 99.9 | 29.2 | 29.2 | 54.0 | 54.0 | 99.9 |
| $594e^{-0.041X}$ | | 115.2 | 33.7 | 33.7 | 62.3 | 62.3 | 115.2 |
| Charpy impact strength | kJ/m² | 46 | 47 | 45 | 46 | 46 | 46 |
| | Evaluation | 3 | 3 | 3 | 3 | 3 | 3 |
| Deflection temperature | °C | 95 | 104 | 94 | 104 | 95 | 94 |
| | Evaluation | 2 | 3 | 2 | 3 | 2 | 2 |
| Spiral flow | mm | 375 | 282 | 393 | 280 | 374 | 362 |
| | Evaluation | 3 | 2 | 3 | 2 | 3 | 3 |
| Plating adhesion strength | N/cm | 6.5 | 8.2 | 6.4 | 6.6 | 6.6 | 6.4 |
| | Evaluation | 1 | 1 | 1 | 1 | 1 | 1 |
| Hot/cold cycle performance | Evaluation | Δ | Δ | Δ | Δ | Δ | Δ |
| | | 1 | 1 | 1 | 1 | 1 | 1 |
| Comprehensive evaluation | Point | 10 | 10 | 10 | 10 | 10 | 10 |
| | Grade | Δ | Δ | Δ | Δ | Δ | Δ |

TABLE 6

| | | Comparative Example | | | | |
|---|---|---|---|---|---|---|
| | | 7 | 8 | 9 | 10 | 11 |
| Graft copolymer (A) [Part by mass] | A-1-1 | | | | | |
| | A-1-2 | | | | | |
| | A-1-3 | | | | | |
| | A-1-4 | | | | | |
| | A-1-5 | 15 | 15 | 34 | 25 | 25 |
| | A-2-1 | | | | | |
| | A-2-2 | | | | | |
| | A-2-3 | | | | | |
| | A-2-4 | | | | | |
| | A-3-1 | | | | | |
| | A-3-2 | | | | | |
| | A-3-3 | | | | | |
| | A-3-4 | | | | | |
| Copolymer (B) [Part by mass] | B-1 | 15 | 45 | 26 | | 40 |
| | B-2 | | | | | |
| | B-3 | | | | | |
| Polycarbonate resin(P) [Part by mass] | P-1 | 70 | | | 75 | |
| | P-2 | | 40 | 40 | | 35 |
| Rubber content (Z) in resin composition for plating | % by mass | 9.0 | 9.0 | 20.4 | 15.0 | 15.0 |
| Rubber content (X) in graft copolymer (A) | % by mass | 60 | 60 | 60 | 60 | 60 |
| Graft ratio (Y) of graft copolymer (A) | % | 56.7 | 56.7 | 56.7 | 56.7 | 56.7 |
| $-0.041X$ | | −2.46 | −2.46 | −2.46 | −2.46 | −2.46 |
| $793e^{-0.041X}$ | | 67.7 | 67.7 | 67.7 | 67.7 | 67.7 |
| $515e^{-0.041X}$ | | 44.0 | 44.0 | 44.0 | 44.0 | 44.0 |
| $594e^{-0.041X}$ | | 50.7 | 50.7 | 50.7 | 50.7 | 50.7 |

TABLE 6-continued

|  |  | Comparative Example | | | | |
|---|---|---|---|---|---|---|
|  |  | 7 | 8 | 9 | 10 | 11 |
| Charpy impact strength | kJ/m² | 37 | 34 | 49 | 48 | 38 |
|  | Evaluation | 1 | 1 | 3 | 3 | 1 |
| Deflection temperature | ° C. | 106 | 98 | 91 | 108 | 91 |
|  | Evaluation | 3 | 2 | 2 | 3 | 2 |
| Spiral flow | mm | 316 | 411 | 321 | 248 | 402 |
|  | Evaluation | 3 | 3 | 3 | 1 | 3 |
| Plating adhesion strength | N/cm | 9.7 | 9.3 | 13.2 | — | 15.3 |
|  | Evaluation | 1 | 1 | 2 | 1 | 3 |
| Hot/cold cycle performance | Evaluation | ◎ | ○ | Δ | — | Δ |
|  |  | 3 | 2 | 1 | 1 | 1 |
| Comprehensive evaluation | Point | 11 | 9 | 11 | 9 | 10 |
|  | Grade | Δ | Δ | Δ | Δ | Δ |

The resin compositions for plating of the Examples were excellent in fluidity. From the resin compositions of the Examples, molded products (test pieces) having excellent impact resistance and heat resistance were obtained. Further, the plated products obtained by plating these molded products (test pieces) showed excellent plating performance, namely high plating adhesion strength and excellent hot/cold cycle performance.

On the other hand, in Comparative Example 1 using the graft copolymer (A-3-1) having a rubber content (X) of 40% by mass, the plating adhesion strength of the plated product was low, and the hot/cold cycle performance was also inferior.

In Comparative Examples 2 to 6 using the graft copolymer (A-3-2) to the graft copolymer (A-3-4), each having a graft ratio (Y) not satisfying the above formula (1), the plating adhesion strength of the plated product was low, and the hot/cold cycle performance was also inferior.

In the case of the resin compositions for plating of Comparative Examples 7 and 8, each having a rubber content (Z) of 9.0% by mass, the impact resistance of the molded product (test piece) was inferior. In addition, the plating adhesion strength of the plated product was low.

In the case of the resin composition for plating of Comparative Example 9 with a rubber content (Z) of 20.4% by mass, the hot/cold cycle performance of the plated product was inferior.

The resin composition for plating of Comparative Example 10 in which the amount of the polycarbonate resin (P) was 75% by mass was inferior in fluidity. In Comparative Example 10, plating deposition did not occur on the molded product (test piece), and the plating adhesion strength and the hot/cold cycle performance could not be evaluated.

In the case of the resin composition for plating of Comparative Example 11 in which the amount of the polycarbonate resin (P) was 35% by mass, the impact resistance of the molded product (test piece) was inferior. In addition, the hot/cold cycle performance of the plated product was inferior.

INDUSTRIAL APPLICABILITY

The present invention can provide a resin composition for plating, which is capable of producing a plated product having excellent plating performance, and hence has great industrial significance.

The invention claimed is:

1. A metal-plated article comprising a resin composition, wherein the resin compositing comprises: a graft copolymer (A) in which a monomer component (a) is graft-polymerized on a polybutadiene; and a polycarbonate resin (P), wherein
   an amount of the graft copolymer (A) is 17 to 50% by mass, based on a total mass of the resin composition,
   an amount of the polycarbonate resin (P) is 40 to 70% by mass, based on a total mass of the resin composition,
   the monomer component (a) comprises 60 to 80% by mass of an aromatic vinyl compound (a1), 20 to 40% by mass of a vinyl cyanide compound (a2), and 0 to 20% by mass of another vinyl compound (a3) copolymerizable with the aromatic vinyl compound (a1) and the vinyl cyanide compound (a2), each based on a total mass of the monomer component (a),
   a rubber content (X) in the graft copolymer (A) is more than 40% by mass, based on a total mass of the graft copolymer (A), wherein the rubber content (X) is measured with respect to the graft copolymer (A) from which an acetone-soluble fraction has not been separated after graft polymerization to produce the graft copolymer (A),
   a graft ratio (Y) of the graft copolymer (A) satisfies formula (1) below:
   $$793e^{-0.041X} \geq Y \geq 594e^{-0.041X} \quad (1),$$
   a rubber content (Z) in the resin composition is 10 to 18% by mass, based on a total mass of the resin composition, and
   a mass-based average particle size of the rubbery polymer is 0.20 to 0.28 μm.

2. The metal-plated article according to claim 1, wherein the rubber content (X) in the graft copolymer (A) is 55 to 70% by mass, based on a total mass of the graft copolymer (A).

* * * * *